United States Patent [19]

Morita et al.

[11] Patent Number: 4,736,421

[45] Date of Patent: Apr. 5, 1988

[54] SYSTEM FOR DISPLAYING THE SUBSCRIPTION STATE OF A PAY BROADCASTING PROGRAM

[75] Inventors: Hiroyuki Morita, Kumagaya; Mitsuo Kunii, Fukaya, both of Japan

[73] Assignee: Kabushiki Kaisha Toshiba, Kawasaki, Japan

[21] Appl. No.: 793,340

[22] Filed: Oct. 31, 1985

[30] Foreign Application Priority Data

Nov. 1, 1984 [JP] Japan .................. 59-229018

[51] Int. Cl.$^4$ .................. H04N 7/167; G06F 7/04
[52] U.S. Cl. .................. 380/20; 340/825.32
[58] Field of Search .................. 358/84, 115, 117, 122; 331/123, 55, 76; 455/2; 340/825.32, 825.33; 380/16, 20

[56] References Cited

U.S. PATENT DOCUMENTS

| | | | |
|---|---|---|---|
| 4,163,254 | 7/1979 | Block et al. | 380/20 |
| 4,196,310 | 4/1980 | Forman et al. | 375/2.1 |
| 4,225,884 | 9/1980 | Block et al. | 380/20 |
| 4,304,962 | 12/1981 | Fracassi et al. | 178/22.14 |
| 4,388,643 | 6/1983 | Aminetzah | 358/117 X |
| 4,475,123 | 10/1984 | Dumbauld et al. | 358/114 X |
| 4,484,027 | 11/1984 | Lee et al. | 358/122 X |
| 4,528,589 | 7/1985 | Block et al. | 358/117 X |
| 4,530,008 | 7/1985 | McVoy | 358/117 X |
| 4,531,020 | 7/1985 | Wechselberger et al. | 380/21 |
| 4,531,021 | 7/1985 | Bluestein et al. | 380/21 |
| 4,536,791 | 8/1985 | Campbell et al. | 358/122 |
| 4,599,647 | 7/1986 | George et al. | 358/122 |
| 4,613,901 | 9/1986 | Gilhousen et al. | 380/20 |

*Primary Examiner*—Stephen C. Buczinski
*Assistant Examiner*—Linda J. Wallace
*Attorney, Agent, or Firm*—Cushman, Darby & Cushman

[57] ABSTRACT

A program data (ATji) corresponding to a scrambled pay program signal, subscribed program data (BTji) representing a program signal subscribed by a subscriber and the scrambled program signal are demodulated by a demodulator. The subscribed program data (BTji) is detected by a data detector and the program data (ATji) is detected by a common data detector. A subscription state discriminating circuit compares the subscribed program data (BTji) with the program data (ATji) and discriminates the program subscription state of the subscriber. A random number generator generates a descrambling signal for descrambling the scrambled program signal when an output signal from said subscription state discriminating means represents that the subscriber has subscribed to the program. A display displays the nonsubscription state when the output signal from said subscription state discriminating means represents that the subscriber has not subscribed to the program.

4 Claims, 4 Drawing Sheets

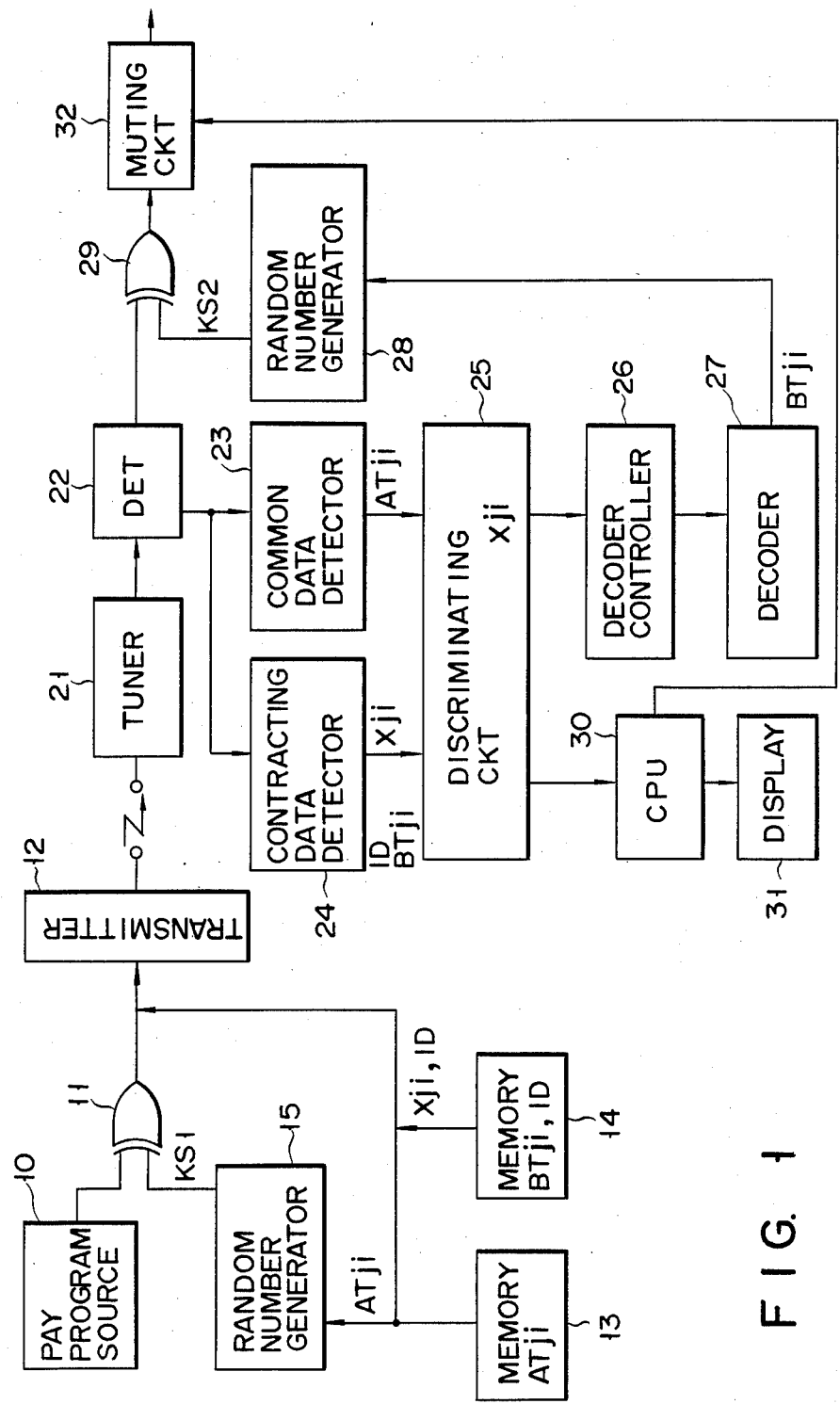
F I G. 1

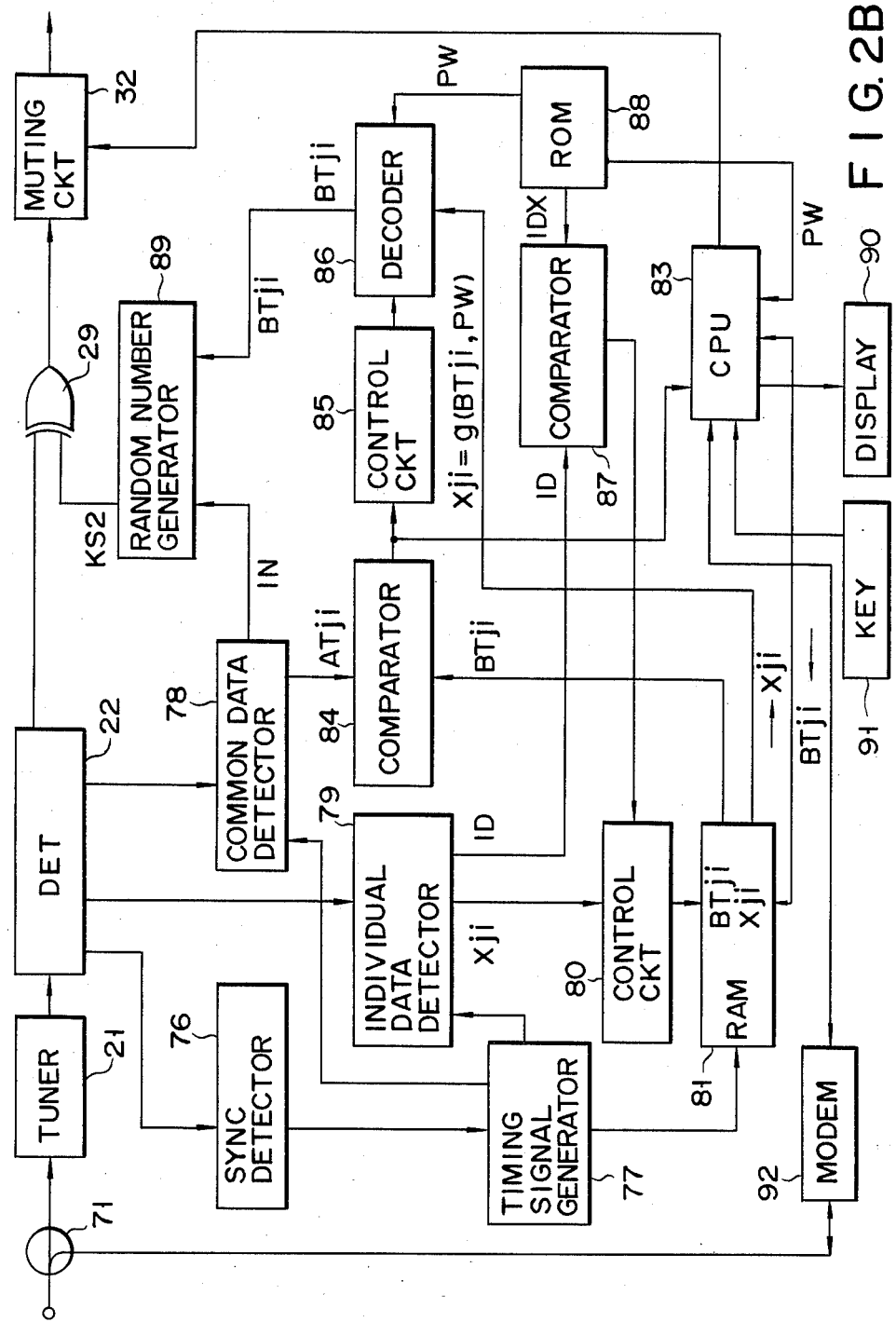

SYSTEM FOR DISPLAYING THE SUBSCRIPTION STATE OF A PAY BROADCASTING PROGRAM

BACKGROUND OF THE INVENTION

The present invention relates to an operation confirmation device for a broadcasting system which transmits video information, audio information, data and graphic information through an antenna or a cable to subscribers who can confirm their own subscription states.

Teletext, high-quality television broadcasting, still image broadcasting, and digital multichannel broadcasting systems have been developed in recent years. Along with increased sophistication and complexity of these broadcasting system techniques, various TV programs have been developed.

A pay program (e.g., a television program) is one of these programs. Pay programs can be received by subscribers who have contracted with program offerers. Since the subscribers pay program fees to the program offerers, pay program systems must prevent illegal reception by nonsubscribers. For this purpose, each pay program is scrambled and is transmitted from the broadcasting station to the subscribers' terminals. The scrambled program is then descrambled by each subscriber's terminal.

When a person wishes to make a contract for pay programs with a program offerer, he calls the broadcasting station and requests a desired pay program. Upon contract, the program offerer registers a subscriber's ID (identification) code and a key signal for descrambling the scrambled program in a memory. The key signal is transmitted together with the pay program. The key signal is then received by the subscriber's terminal, and the scrambled program is descrambled by the key signal. Therefore, the subscriber can watch and listen to the desired subscribed program.

When the subscriber cannot watch and listen to his desired subscribed program, he might think that his subscriber's terminal is out of order or the station has erroneously sent another program to a subscriber who has not subscribed. Such a circumstance occasionally causes a misunderstanding as to whether the subscriber has contracted the desired program.

SUMMARY OF THE INVENTION

The present invention has been made in consideration of the above situation and has as its object to provide an operation confirmation device. This device informs the subscriber that a program which he wishes to watch is not contracted.

In order to achieve the above object of the present invention, there is provided an operation confirmation device comprising:

a first detecting means for detecting a scrambled program signal, program data (ATji) designating the scrambled program signal, identification data (ID) designating a subscriber, and key data (Xji) designating subscribed program data (BTji), the subscribed program data designating the scrambled program signal contracted by the subscriber, and the scrambled program signal, the program data, the identification data and the key data being included in a broadcasting signal;

second detecting means for detecting the subscribed program data (BTji) from the key data (Xji);

third detecting means for detecting the program data (ATji);

subscription state discriminating means for comparing the subscribed program data (BTji) from the second detecting means with the program data (ATji) from the third detecting means and discriminating a pay program subscription state of the subscriber;

descrambling signal generating means for generating a descrambling signal for descrambling the scrambled program signal when the subscribed program data (BTji) coincides with the program data (ATji); and display means for displaying the nonsubscription state when the subscribed program data (BTji) differs from the program data (ATji).

BRIEF DESCRIPTION OF THE DRAWINGS

FIG. 1 is a block diagram illustrating an embodiment of the present invention;

FIGS. 2A and 2B are block diagrams of a CATV system to which the present invention is applied.

DETAILED DESCRIPTION OF THE PREFERRED EMBODIMENT

Figure 2A:
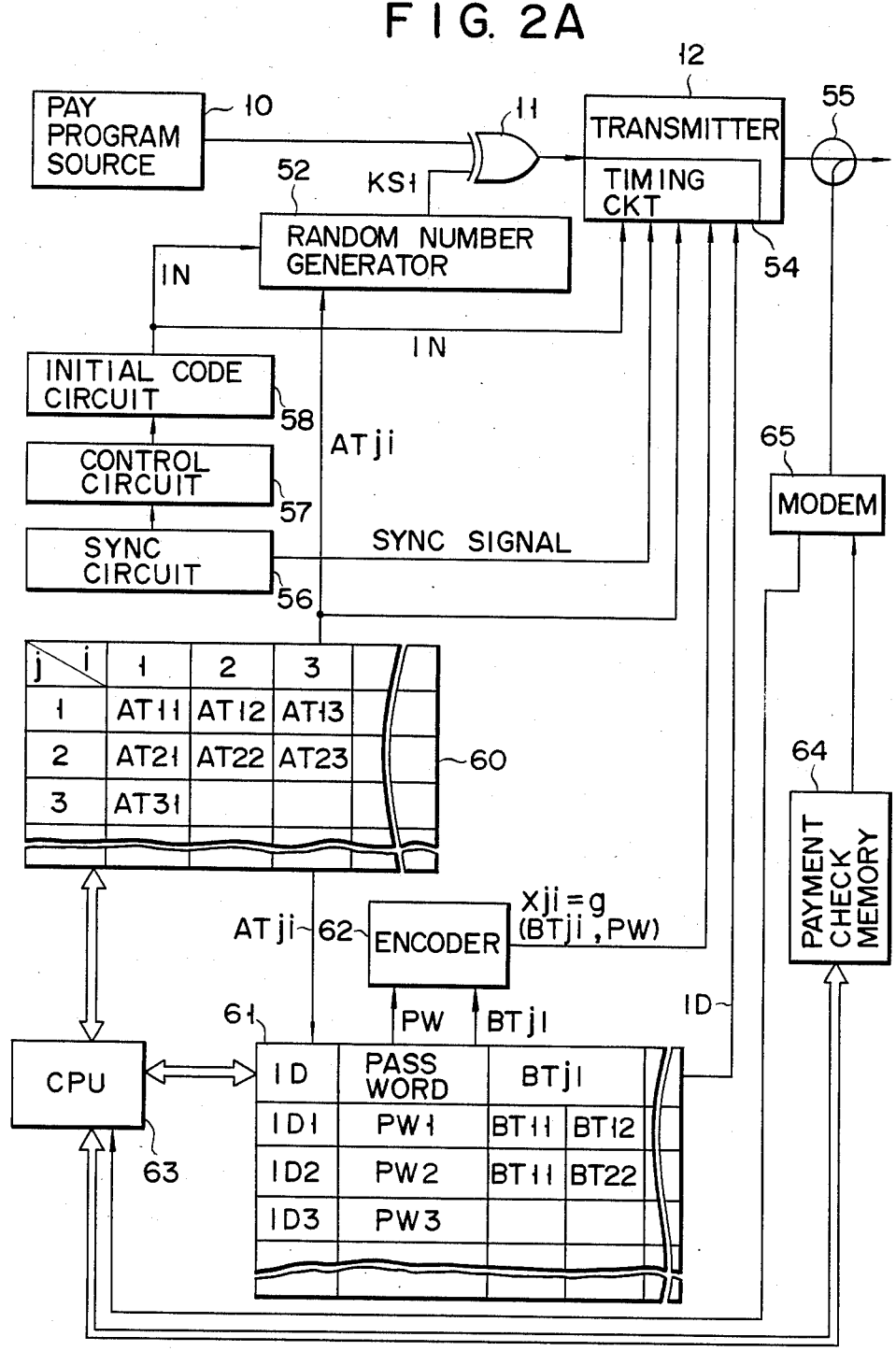

The preferred embodiment of the present invention will be described in detail with reference to the accompanying drawings.

As shown in FIG. 1, a pay program from a source 10 is supplied to an exclusive OR gate 11 (which may be digital) serving as a scrambling means for scrambling the pay program signal. The scrambled signal is supplied to a transmitter 12. The transmitter 12 converts the scrambled signal to a high-frequency signal and sends it out over a transmission line.

The broadcasting station has memories 13 and 14. The memory 13 stores program data designated as ATji(j, i=1 to N). The data ATji is stored in a memory 13. An affixed symbol j represents the type (i.e., sports, movies, news and others) of the program, and affixed symbol i represents a channel. The memory 14 stores a subscriber's ID (identification) data and subscribed pay program data BTji. The data BTji is selected from among the data ATji by the subscriber.

The memory 14 is connected to an encoder (not shown) which encodes the data BTji associated with the password PW and generates key data Xji for enhancing the secrecy of the data BTji. The data Xji is supplied to a subscriber's terminal through the transmitter 12 for descrambling the scrambled signal.

The data ATji is also supplied to the subscriber's terminal through the transmitter 12 for acknowledging the current pay program and at the same time to a random number generator 15 so as to change the random generation mode thereof. Also, the data Xji and the data ID are supplied to the transmitter 12 and hence to the subscriber's terminal so as to allow the terminal to descramble the scrambled signal. The data Xji, the data ID and the data ATji are multiplexed with a control packet signal every time a pay program is transmitted. The generator 15 comprises M-series shift registers. A scrambled signal KS1 is supplied from the generator 15 to the gate 11 for scrambling the pay program signal.

The broadcasting signal is received by a tuner 21 in the subscriber's terminal. A signal from the tuner 21 is detected by a detector 22. The detected signal is then supplied to an exclusive OR gate 29 (which may be digital). The detected signal is also supplied to a common data detector 23 for extracting the program data ATji and to a contracting data detector 24 for extracting the data ID and the data Xji. The contracting data detector 24 holds the data Xji when the extracted data ID is equal to the identification data stored in a ROM and decodes the data Xji into the data BTji.

The data ATji from the detector 23 and the data BTji from the detector 24 are supplied to a subscription state discriminating circuit 25. The circuit 25 compares the data ATji and the data BTji and supplies a coincidence or noncoincidence signal to a CPU 30 and a decoder controller 26. When controller 26 receives the coincidence signal, it supplies the data Xji to a decoder 27. The decoder 27 generates the decoded data BTji and supplies it to a random number generator 28. As a result, the generator 28 generates a descrambling signal KS2. The signal KS2 is then supplied to exclusive OR gate 29 constituting the descrambling means. The descrambling signal KS2 and the scrambling signal KS1 are identical. Therefore, the OR gate 29 generates a descrambled signal representing the current pay program.

However, when the circuit 25 generates the noncoincidence signal, the CPU 30 drives a display 31. The display 31 either flickers or displays a message indicating that the subscriber has not contracted the program.

When the subscriber cannot receive the desired pay program as described above, he can easily know his mistake on his own display 31. In this case, the output of the gate 22 will be a noise signal, but a muting circuit is caused to be turned on by the CPU 30 so the noise is eliminated from the television receiver and an audio circuit.

In the above embodiment, the display 31 indicates that the subscriber has not contracted. However, instead of the display, a sound source may be used.

FIG. 2 shows a CATV system to which the present invention is applied.

Referring to FIG. 2A, a pay program signal from a pay program source 10 is scrambled by an exclusive OR gate 11 in response to a scrambling signal KS1 from a random number generator 52, and the scrambled signal is supplied to a transmitter 12. The transmitter 12 has a timing circuit 54. The circuit 54 multiplexes current program data ATji, key data Xji, the subscriber's identification data ID and initial data IN in response to a sync signal from a sync circuit 56 and generates a transmission control packet signal. The transmission signal from the transmitter 12 is sent onto a trunk cable through a bidirectional coupler 55.

The sync signal from the sync circuit 56 is also supplied to a control circuit 57. The circuit 57 generates a random number generation mode signal to the generator 52 through an initial code circuit 58 when the pay program is changed. The generator 52 determines the random number generator sequence in accordance with the data IN and ATji.

The data ATji is stored in a memory 60. An affixed symbol j represents the type (i.e., sports, movies, news and others) of a program, and an affixed symbol i represents a channel. In the case of FIG. 2A, programs AT11, AT21 and AT31 are broadcast in different time ranges in the first channel, and data in a memory 61 is used for descrambling the scrambled signal. The memory 61 stores the data ID, the password PW of each subscriber, and the data BTji representing a contract between each subscriber and the program offerer. In the case of FIG. 2A, for example, the subscriber having the data ID1 and the word PW1 contracts for pay programs BT11 and BT12. The data ID and Xji are then transmitted to each subscriber. The data Xji is encoded by an encoder 62 by using the data BTji and the word PW so as to ensure secrecy.

A CPU 63 controls the memories 60 and 61, a payment check memory 64 and so on. When the subscriber wishes to watch a pay program, for example, CPU 63 checks whether or not the subscriber has finished payment of the pay program by using the data of the memory 64. If he has paid for the pay program, the CPU 63 can cause the data ID, the word PW and the data BTji to be sent. However, when he has not paid the fee for the pay TV program, CPU 63 will not cause the data BTji to be sent. Thus, that subscriber is checked for nonpayment at the encoder, and he is restricted from watching pay programs when he has not paid. The CPU 63 receives upstream data from the subscriber through a modem 65 and sends downstream data to the subscriber through the modem 65.

Referring to FIG. 2B, the broadcasting signal is supplied to a tuner 21 through a bidirectional coupler 71. A selected channel signal is detected by a detector 22. A demodulated video signal (i.e., the scrambled signal) is supplied to an exclusive OR gate 29. When the descrambing signal KS2 is the proper signal, the original video signal can be reproduced. The video signal from the gate 29 is then supplied to the television receiver through a muting circuit 32 which is held in the OFF state.

The detected signal from the detector 22 is also supplied to a sync detector 76, an individual data detector 79 and a common data detector 78. The detector 76 detects a sync signal and supplies a detection signal to a timing signal generator 77. The generator 77 generates different timing pulses for synchronizing the operations of the respective circuits in the terminal. The detector 79, on the other hand, detects the data ID and Xji, and the data ID is supplied to a comparator 87. The comparator 87 compares the received data ID and the subscriber's data IDx stored in a ROM 88 and supplies a coincidence pulse to a control circuit 80 when a coincidence between these input signals is established. In this case, the circuit 80 supplies the data Xji to a RAM 81. A CPU 83 fetches the data Xji and the password PW read out from the ROM 88 and decodes the data Xji into the data BTji. The data BTji corresponding to the data Xji is also stored in the RAM 81. If the subscriber has not paid the fee for the pay program, the data BTji is never obtained in which case the data Xji is never stored in RAM 81. As a result, even if the subscriber desires to send a program request signal, no data Xji is supplied through CPU 83 and RAM 81 to decoder 86 since the encoder will keep the data BTji from being sent unless the fee is paid; therefore, no legitimate program request signal may be obtained from decoder 86.

The current program data ATji detected by the detector 78 is supplied to a comparator 84. The comparator 84 compares the data ATji with the data BTji read out from the RAM 81. When a coincidence between the data ATji and BTji is established, a coincidence signal is supplied from the comparator 84 to a control circuit 85. In this case, the circuit 85 supplies the control signal to a decoder 86 which is then enabled. The decoder 86 uses the data Xji $\{=g(BTji, PW)\}$ from the RAM 81 and the password PW from the ROM 88 and decodes the data Xji to the data BTji. The data BTji is then supplied to a random number generator 89. The initial data IN detected by the detector 78 is supplied together with the data BTji to the generator 89. Accordingly, the descrambling signal KS2 which is the same as the scrambling signal KS1 is obtained.

Thus, when the comparator 84 generates a noncoincidence signal, the CPU 83 is supplied the noncoincidence signal. Then the CPU 83 drives a display 90 indicating that the subscriber has not contracted the current pay program. Such display can be performed by flickering of a light-emitting element or by displaying of a message or a program number on a liquid crystal or CRT display. Under this condition, the descrambling signal is not normal, and the output signal from the exclusive OR gate 29 is a noise signal. Therefore, the CPU 83 turns on the circuit 32 to eliminate the noise signal from the television receiver and the audio circuit.

A keyboard 91 is used to turn on/off the power source of the terminal. Alternatively, the keyboard 91 can be used to reserve a pay program by generating a program request signal. When a pay program reservation is made, a program code entered by the subscriber is multiplexed by the CPU 83 with the subscriber's ID code, and the multiplexed data is supplied to a modem 92 and transmitted as an upstream signal. The upstream signal is demodulated by the modem 65 of FIG. 2A, and the demodulated signal is fetched by the CPU 63. The CPU 63 detects the data ID and checks a subscriber's balance (i.e., payment state) stored in the memory 64. When the fee is not yet paid by the subscriber, the subscribed program data is not written by the CPU 63 into the memory 61. The data from the memory 64 is also utilized as a downstream signal to caution subscribers who have not yet paid for the pay programs.

Figure 3:
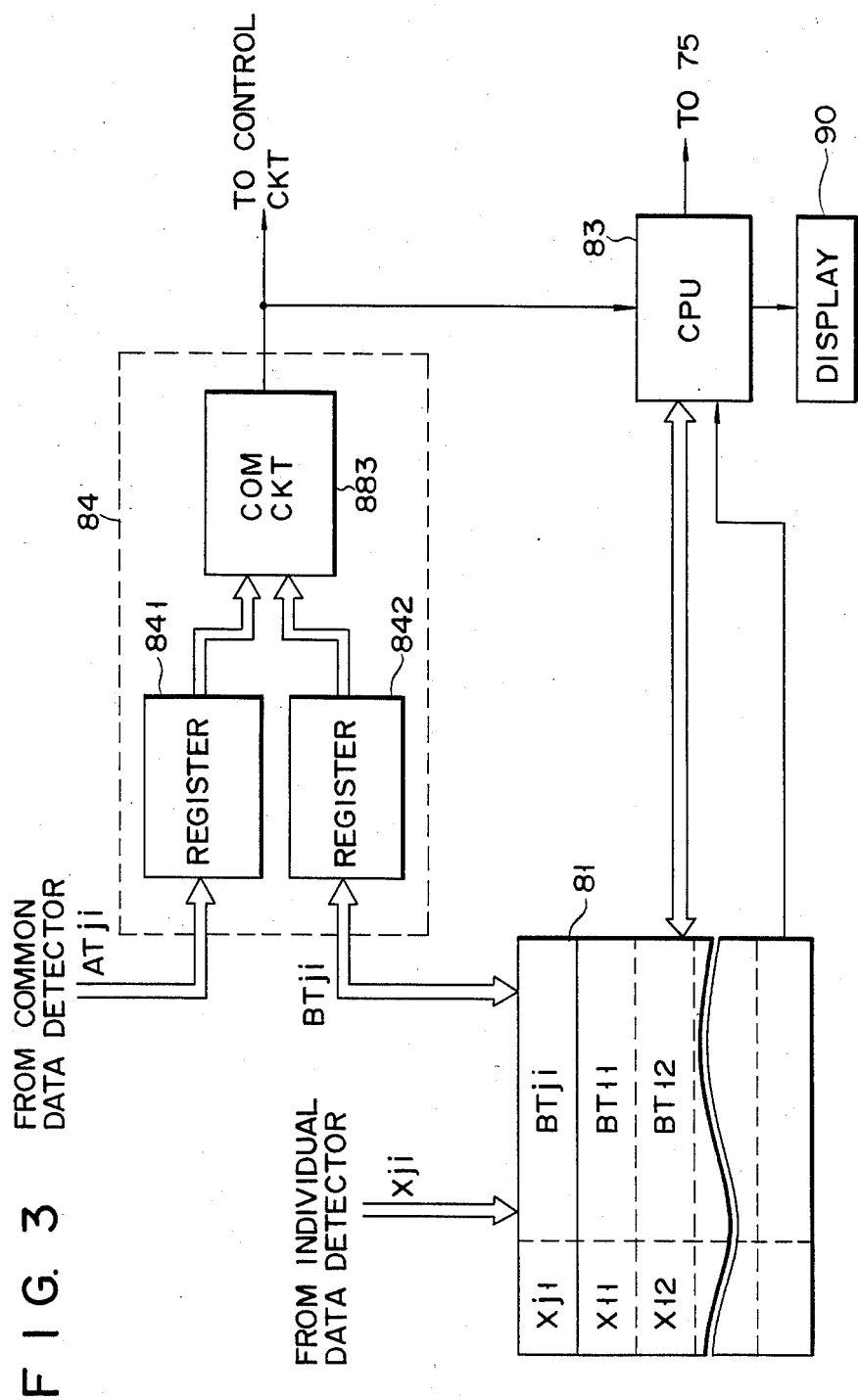
FIG. 3 is a block diagram which shows a more detailed circuit of the data extracting circuit shown in FIG. 2B.

FIG. 3 shows the detailed arrangement of the RAM 81 and the comparator 84 shown in FIG. 2B. The RAM 81 stores contracted program data BT11 and BT12. The data ATji is stored in a register 841 in the comparator 84. The data ATji is compared by a comparison circuit 883 with the data BT11 which is stored in register 842. When the circuit 883 generates a noncoincidence signal, the CPU 83 supplies the next data BT12 to a register 842. In this manner, when a plurality of data BTji are stored in the RAM 81, each of the plurality of data BTji stored in the RAM 81 is sequentially compared with the data ATji until the coincidence signal is obtained. However, when a coincidence is not established, the CPU 83 drives the display 90.

This invention does not necessarily have to be used only in a pay broadcasting system, but it may be used in a secret communication network system.

What is claimed is:

1. A system for displaying the subscription state of a pay broadcasting program, comprising:
   an encoder, comprising:
   (a) program signal scrambling means for scrambling a pay program signal using a random number so as to produce a scrambled pay program signal,
   (b) random number generating means for generating the random mumber,
   (c) means for determining an initial value for said random number generating means,
   (d) key data generating means for generating key data obtained by coding, using a subscriber's first coding data, subscribed program data showing a kind of pay subscription program to be offered to the subscriber, and
   (e) a transmitter for transmitting a broadcasting signal containing said key data as secret data, a subscriber's second coding data identifying the subscriber, current program data representing the pay program currently being broadcast, and said scrambled pay program signal; and
   a decoder for decoding said broadcasting signal for display, comprising:
   (a) a common data detector for extracting said current program data,
   (b) an individual data detector for extracting said key data as said secret data and for extracting said second coding data,
   (c) a first comparator for detecting a coincidence between said second coding data extracted by said individual data detector and coding data which is used to identify said decoder,
   (d) a first control circuit enabling said key data which has been extracted by said individual data detector to be stored in a memory in response to a coincidence output of said first comparator,
   (e) signal generating means for generating a subscriber program request signal when the subscriber wishes to view a subscribed pay program,
   (f) controlling means for detecting said subscribed program data from said key data and for writing said subscribed program data into said memory only when said key data has been enabled to be written into said memory,
   (g) a second comparator for comparing said subscribed program data written by said controlling means into said memory with said current program data extracted by said common data detector,
   (h) a subscribed program data decoder for decoding said subscribed program data from said key data stored in said memory using the subscriber's first coding data,
   (i) a second control circuit for controlling said subscribed program data decoder in response to a coincidence signal from said second comparator,
   (j) random number generating means having an initial value set using said subscribed program data decoded from said key data by said subscribed program data decoder for generating a random number for descrambling said scrambled pay program signal,
   (k) descrambling means for descrambling said scrambled pay program signal with the use of said random number from said random number generating means, and
   (l) alarm means for producing an alarm when said second control circuit is not enabled in response to the comparison output of said second comparator.

2. A system according to claim 1, wherein said key data generating means comprises:
   a first memory for storing said current program data;
   a second memory for storing said subscriber's first and second coding data and said subscribed program data;
   a payment check memory for storing data showing whether or not a fee has been paid for said pay program when said subscriber program request signal is generated by said signal generating means; and
   processing means responsive to said subscriber program request signal for checking said payment check memory to determine whether said fee has been paid for the pay program and, only when said fee has already been paid by the subscriber for said pay program, for reading said current program data corresponding to said pay program from said first memory, and for writing said program data corresponding to said pay program paid for into said second memory as said subscribed program data.

3. A system according to claim 1, further comprising a muting circuit connected to said descrambling means for muting an output from said descrambling means when the subscribed program data differs from the current program data.

4. A system according to claim 3 wherein said muting circuit is turned on when said alarm means produces said alarm indicating that the received broadcasting signal contains a pay program that has not been reserved by the subscriber.

* * * * *